(12) United States Patent
Yun

(10) Patent No.: US 9,793,699 B2
(45) Date of Patent: Oct. 17, 2017

(54) AUTOMATED CORD REEL APPARATUS

(76) Inventor: Sung Yol Yun, Henderson, NV (US)

( * ) Notice: Subject to any disclaimer, the term of this patent is extended or adjusted under 35 U.S.C. 154(b) by 62 days.

(21) Appl. No.: 13/408,935

(22) Filed: Feb. 29, 2012

(65) Prior Publication Data

US 2013/0098725 A1   Apr. 25, 2013

(51) Int. Cl.
*H02G 11/02* (2006.01)
*B65H 75/44* (2006.01)
*B65H 75/48* (2006.01)

(52) U.S. Cl.
CPC ............. *H02G 11/02* (2013.01); *B65H 75/44* (2013.01); *B65H 75/48* (2013.01)

(58) Field of Classification Search
CPC ......... B65H 75/44; B65H 75/48; H02G 11/02
USPC .................. 191/12.2, 12.2 R, 12.2 A, 12.4
See application file for complete search history.

(56) References Cited

U.S. PATENT DOCUMENTS

| | | | | | |
|---|---|---|---|---|---|
| 2,606,067 | A | * | 8/1952 | Roark | A62C 25/005 137/355.17 |
| 4,196,864 | A | * | 4/1980 | Cole | A01K 89/003 242/118.6 |
| 4,378,473 | A | * | 3/1983 | Noorigian | H02G 11/02 191/12.2 R |
| 4,436,190 | A | * | 3/1984 | Wentzell | B65H 75/4449 191/12.2 R |
| 4,685,634 | A | * | 8/1987 | Schwartz | B65H 75/40 191/12.4 |
| 4,721,833 | A | * | 1/1988 | Dubay | B65H 75/40 191/12.2 A |
| 4,897,512 | A | * | 1/1990 | Johnston | H02G 11/02 191/12.4 |
| 5,775,473 | A | * | 7/1998 | Cordero | B65H 75/38 191/12.2 A |
| 6,149,096 | A | * | 11/2000 | Hartley | B65H 75/40 191/12.2 A |
| 6,669,135 | B1 | * | 12/2003 | Hartley | B65H 75/40 191/12.2 A |
| 7,331,436 | B1 | * | 2/2008 | Pack | B65H 75/425 191/12.2 A |
| 2003/0110970 | A1 | * | 6/2003 | Sansolo | B65H 75/364 102/200 |
| 2008/0164363 | A1 | * | 7/2008 | Caamano | B65H 75/403 242/390.2 |
| 2009/0057085 | A1 | * | 3/2009 | Caamano | B65H 75/40 191/12.4 |
| 2010/0084500 | A1 | * | 4/2010 | Inman | B65H 75/38 242/390.8 |
| 2014/0111158 | A1 | * | 4/2014 | Kinomura | H02G 3/0493 320/109 |
| 2014/0175211 | A1 | * | 6/2014 | Mizuno | B65H 51/10 242/390.1 |

* cited by examiner

*Primary Examiner* — Zachary L Kuhfuss
(74) *Attorney, Agent, or Firm* — John K. Park; Park Law Firm

(57) ABSTRACT

The present disclosure is of an automated cord reel apparatus comprising a housing; an electrical cord accommodated into the housing with one end of the electrical cord being mounted with a plug member connected to a wall receptacle and the other end of the electrical cord being mounted with an extension socket; and an electric cord unwinding/winding device for unwinding or winding the electric cord in response to a user option, wherein the electric cord, a motor adjusting a rotation direction of the guide unit, and a switch mounted at the extension socket to turn on/off and forwardly/backwardly rotate the motor.

5 Claims, 5 Drawing Sheets

AUTOMATED CORD REEL APPARATUS

SPECIFICATION

Pursuant to 35 U.S.C. §119(a), this application claims benefit of earlier filing date and right of priority to Korean Patent Application No. 10-2011-0107271, filed on Oct. 20, 2011, the contents of which is hereby incorporated by reference in their entirety.

BACKGROUND OF INVENTION

Field of Invention

The present invention is related to an apparatus and method of reeling a long electric cord that is automated. More particularly, the invention relates to an automated apparatus that allows the extension and/or retraction of an electric cord by a push of a button located at the farthest end of the cord.

Description of Prior Art

A majority of modern appliances and electric equipment available are not powered by battery but directly by high-voltage electricity through an electric cord that plugs into an electrical plug outlet. Almost all such appliances and electric equipment have an electric cord that is a few feet in length. As such, the cord restricts the use of the appliance or equipment to the operable within a few feet, the length of the cord, from the electric plug outlet that is generally mounted to a wall or electric post. However, often, appliances and electric equipment must be used several feet away from the electric plug outlet; some equipment must be used a few hundred feet away from the electric plug outlet. Accordingly, the length of the cord of an appliance or equipment poses a major restriction on the where the appliance or equipment can be operated. Such restriction is the source of major burden and frustration.

To resolve the above problem, long flexible extension cords are available. The extension cords can be over 100 feet in length. These extension cords have a male end that is plugged into an electric plug outlet and a female end into which the appliance or electric equipment can be plugged. Thus, the extension cord allows the cord of an appliance or equipment to be extended by its length. With a long cord extension, the operation of the appliance or equipment is no longer restricted to the length of its own electric cord, its reach is now extended by the extra length of the extension cord.

However, the length of the extension cords can be substantially long and difficult to maintain rolled up without entanglement in an orderly fashion. Many users of such long extension cords manually roll up the cord around their arms. Some devices are available that allow the cord to be manually rolled up around a hub or spool. Yet other devices include a rotatable hub or spool mounted inside a housing around which the cord can be wound. Additionally, the hub or spool may be equipped with a retraction mechanism, such as a motor, operable to rotate the spool in a wind direction for the purpose of retracting or winding the elongated cord around the spool.

Other prior art include Korean Patent No. 1995-0013354 (published on May 15, 1995), Korean Utility Model No. 20-0445813 (registered on Aug. 25, 2009), and U.S. Patent Application No. 2010/0084500.

A major disadvantage of the prior art is the location in which the switch or button to activate the reel is located. The prior art has the button or switch located on the housing in which the rotatable hub or spool is located. The problem with this configuration is that it requires at least two people to operate. One person stands by the housing to activate and deactivate the switch or button that winds or unwinds the extension cord. The extension cord can be hundreds of feet in length so the other person must follow the end of the extension cord as it is wound or unwound to ensure it does not get wrapped or tangled with anything. When unwinding the extension cord, the person at the end of the cord would have to yell to the person at the switch to stop the motor when the cord is at the desired length. The end of the cord can be hundreds of feet away from the housing, around walls and up some stairs, thus making it cumbersome for the person at the end of the cord to yell to the person standing by at the switch. Thus, the location of the button or switch in the prior art is a major disadvantage.

Accordingly, there is a need for an automated cord reel apparatus which has the spool activating switch or button located at the end of the extension cord rather than on the spool housing. The automated cord reel apparatus must also provide a safe and secure manner of winding the extension cord without the risk of electrocution of the user. Since the switch or button is located at the end of the extension, cord, the electricity flowing to the switch or button through the entire length of the cord must be safe and secure.

SUMMARY OF THE INVENTION

Accordingly, the present invention has been made in view of the above-mentioned disadvantages occurring in the prior art. The present invention is an automated cord reel apparatus capable of winding and unwinding a cord reel with a predetermined speed and force by simple manipulation of a switch that is located at the furthest end of the electrical cord rather than at housing where the rotating reel is located.

It is therefore a primary object of the present invention to forwardly and backwardly rotate a cord reel by the operation of a switch to extend or retract an electrical cord at a predetermined speed and force, whereby the electrical cord can be prevented from being entwined during extension and/or extraction of the electrical cord.

Another object of the present invention is to have the switch mounted adjacent to an extension socket at the furthest end of the electrical cord, whereby the user can operate the motor without having to walk back to the location of the housing in which the reel is located.

Yet another object of the present invention is to operate it using high powered electricity that is properly protected and managed so that it does not damage or injure the user.

A final object of the present invention is to power the automated cord reel of the present invention using a portable rechargeable battery.

The above objects and other features and advantages of the present invention, as well as the structure and operation of various embodiments of the present invention, are described in detail below with reference to the accompanying drawings.

DESCRIPTION OF THE DRAWINGS

The accompanying drawings which are incorporated by reference herein and form part of the specification, illustrate various embodiments of the present invention and, together with the description, further serve to explain the principles of the invention and to enable a person skilled in the pertinent art to make and use the invention. In the drawings, like reference numbers indicate identical or functional similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
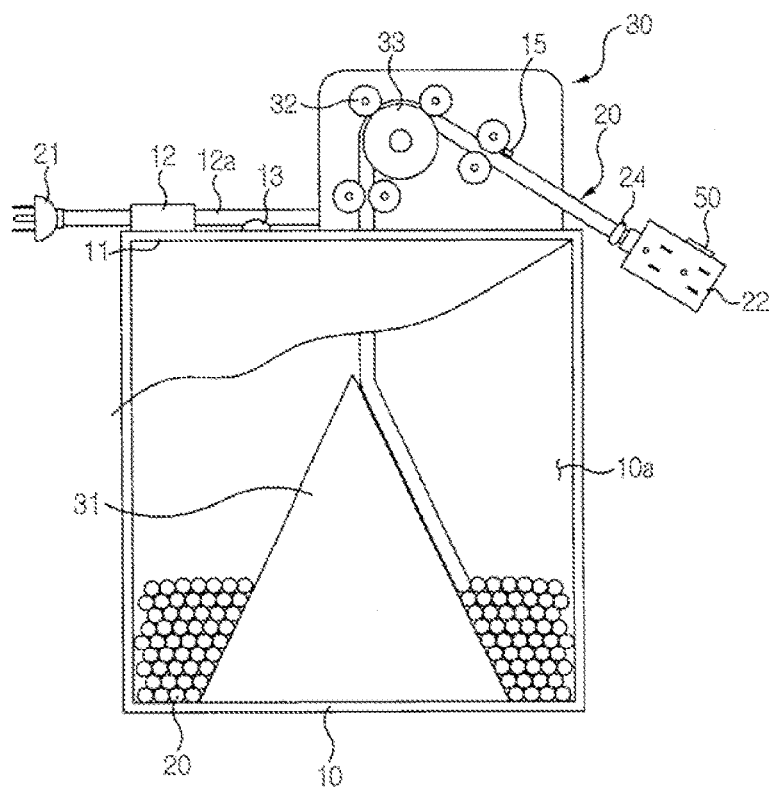
FIG. 1 is a sectional side view of the automated cord reel apparatus of the present invention in its assembled state as it would be used with an electrical cord.

Reference will now be made to the drawings in which various elements of the present invention will be given numerical designations and in which the invention will be discussed so as to enable one skilled in the art to make and use the present invention.

The present invention comprises a cord reel apparatus 100 having a housing 10, an electrical cord 20, and an electrical cord unwinding/winding device 60.

The housing 10 is provided in an approximately cylindrical member and includes therein an inner space 10a for accommodating the electrical cord 20. The upper side of the housing 10 is partially closed by a cover 11. The electrical cord unwinding/winding device 60 is attached to the upper side of the cover 11.

The electrical cord 20 comprises a core of conductive material, a first distal end, and a second distal end. The first distal end has a plug member 21 that can be connected to a power receptacle in a wall (not shown in figures). The second distal end has an extension socket 22 to which other plug members of other appliances can be connected by the user.

Additionally, the housing 10 has a junction box 12 that fixes the first distal end of the electrical cord 20 to keep the plug member 21 exposed and prevent it from falling inside the housing 10. The junction box 12 serves to secure the electrical cord 20 to the cover 11 that is mounted on top of the housing 10. The junction box 12 may be located near a cord guide 12a that is also attached to the cover 11 and aids in guiding the electrical cord 20 as it is pulled out from the housing 10.

A balancing switch 13 is attached to the cover near the junction box 12. A limit switch 15 is attached to the electrical cord 20 at second distal end in close proximity to the extension socket 22. The limit switch 15 activates when the electrical cord 20 is retracted up to a predetermined length. This prevents the second distal end of the electrical cord 20 from falling into the housing along with the extension socket 22.

The unwinding/winding device 60 allows the second distal end of the electrical cord 20 to be extended or retracted from the housing 10. The unwinding/winding device 60 comprises a guide unit 30, a motor 40, and a switch 50.

The guide unit 30 includes a conical guide member 31, a plurality of idle roller members 32, and a main roller member 33. The conical guide member 31 is centrally protruded from the bottom side of the housing 10 to taper toward the upper side of the housing 10 in a shape of a cone, as shown in FIG. 1. The electrical cord 20 is then wound around the conical guide member 31 with more windings toward the top than toward the bottom, as shown in FIG. 1. The primary purpose of the conical guide member 31 is to prevent entanglement of the electrical cord 20 inside the housing 10.

The plurality of idle roller members 32 are arranged on an unwinding/winding path through which the electrical cord 20 is directed as it is wound and unwound from the housing 10. The main roller member 33 is attached to the motor 40 that rotates it to extract the electrical cord 20 from the housing or withdraw the electrical cord 20 inside the housing, depending on the direction of rotation. As the electrical cord 20 is extracted or withdrawn by the motor 40 and main roller member 33, the electrical cord 20 is guided along the unwinding/winding path by the plurality of idle roller members 32.

Figure 2:
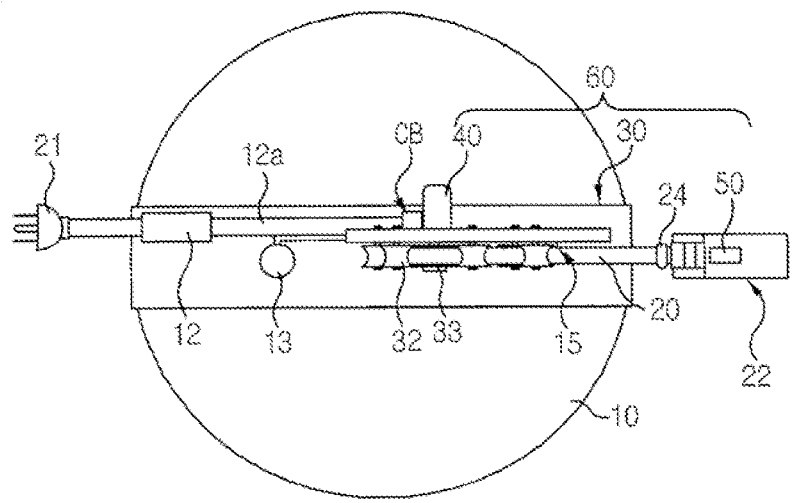
FIG. 2 is top view of the automated cord reel apparatus of the present invention in its assembled state as it would be used with an electrical cord.

As shown in FIG. 2, the periphery of the idle roller member 32 and the main roller member 33 are formed with a concave groove that matches the rounded shape of the electrical cord 20. With the help of the concave groove, the idle roller member 32 and the main roller member 33 serve as pulleys to wrap and guide the movement of the electrical cord 20 through the unwinding/winding path without slipping.

The motor 40 serves to adjust the rotation direction of the guide unit 30, and can be operationally controlled by a control signal from the controller CB. The controller CB detects a first position and a second position of the switch 50 to forwardly and backwardly rotate the motor 40.

An AC (alternating current) power is delivered to the motor 40 from the wall receptacle to which the plug member 21 is connected. This power is delivered to the motor 40 through separate wires within the electrical cord 20. For example, assuming that the electrical cord 20 is designed for single phase AC power, then the wiring configuration of the electrical cord 20 would include five wires to supply the AC power and two wires to supply power to the motor 40.

Figure 3:
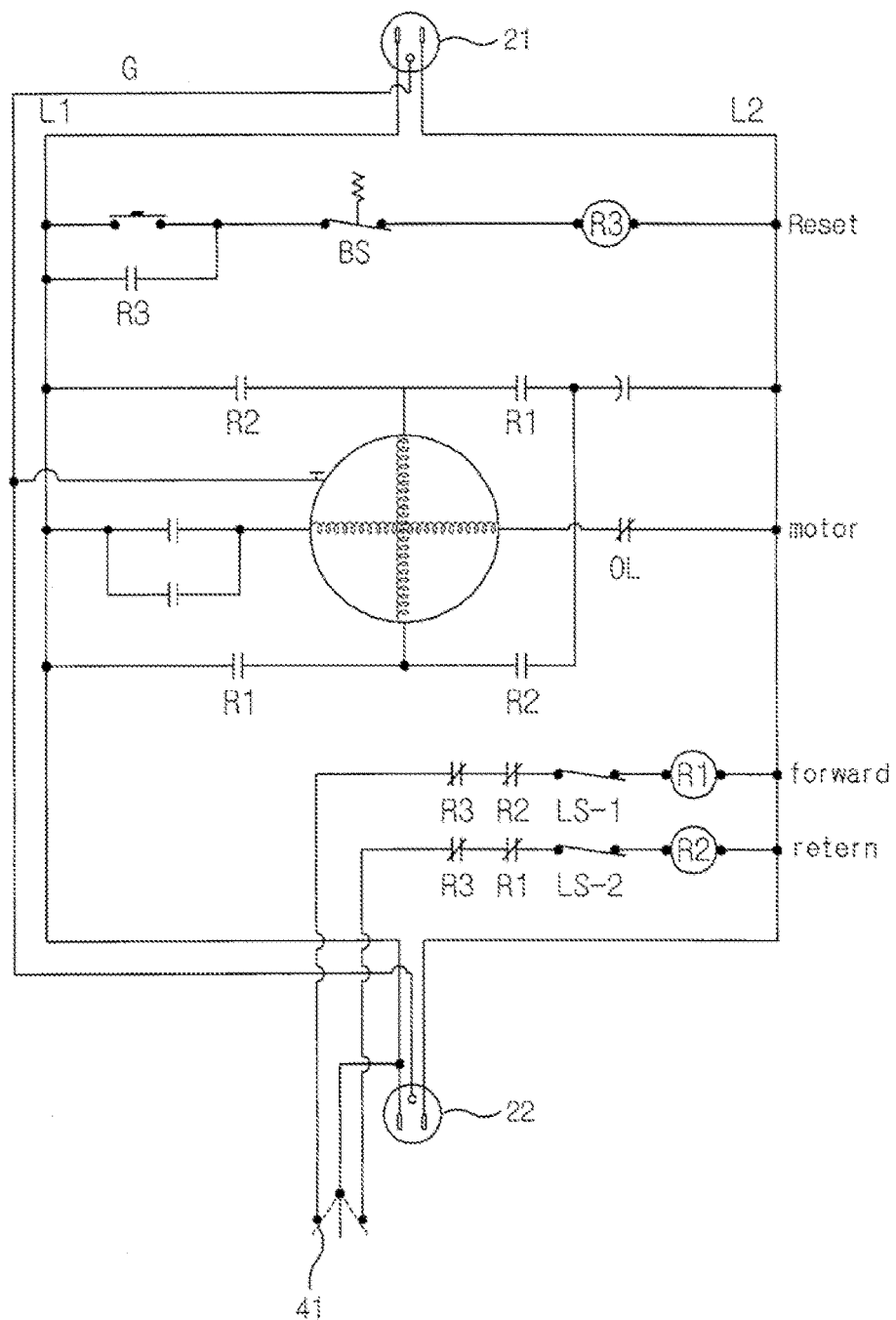
FIG. 3 is an electrical schematic diagram of the electronic circuit used in the automated cord reel apparatus of the present invention.

Alternatively, as shown in FIG. 3, a circuit of the controller CB is so configured as to divide the power supplied from the plug member 21, where part of the power is supplied to a motor control switch 41 for turning on/off the motor 40, while balance of power is supplied to the extension socket 22. In this case, there may be generated a power loss but no great influence will be inflicted due to the fact that the motor 40 is not operated while the electrical cord 20 is extended and used to supply power to an appliance or other device connected to it.

Furthermore, as shown in FIG. 3, the motor 40 is rotated in a forward direction (R1, forward) and a backward direction (R2, return) in response to operation of the switch 50, such that the electrical cord 20 may be conveniently retracted or extended through bidirectional rotation as necessary.

The motor 40 may be an AC motor operated by the commercial AC power from the wall receptacle, or may be a DC (direct current) motor operated by a separate battery, the configuration of which will be described later.

A switch 50 is mounted on the extension socket 22 to control the forward and backward rotation of the motor 40.

Figure 4:
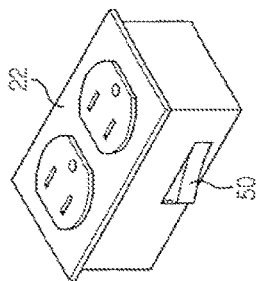
FIG. 4 is a perspective view of the extension socket of the present invention.

As shown in FIG. 4, the switch 50 is mounted to the lateral side wall surface of the extension socket 22. The switch 50 includes a first position that forwardly rotates the motor 40 and a second position that backwardly rotates the motor 40. In other words, the motor 40 only operates when the switch 50 is placed on the first or second position. The motor 40 is inoperable when the switch 50 is in the neutral position. Thus, with the single switch 50, the user of the present invention can fully operate the motor 40 to wind or unwind the electrical cord 20.

It should be noted that, although FIG. 4 shows the switch 50 in the lateral side wall surface, it can be located at any of the surfaces of the extension socket 22. But the fact that the switch 50 is located on the extension socket 22 allows the user of the present invention to extend or retract the electrical cord 20 as needed without having to walk back to the housing 10 as is required by the prior art.

An alternative embodiment of the cord reel apparatus 100 according to the present invention comprises a base frame 110, a reel body 120, an electrical cord 130, and a driving unit 140.

Figure 5:
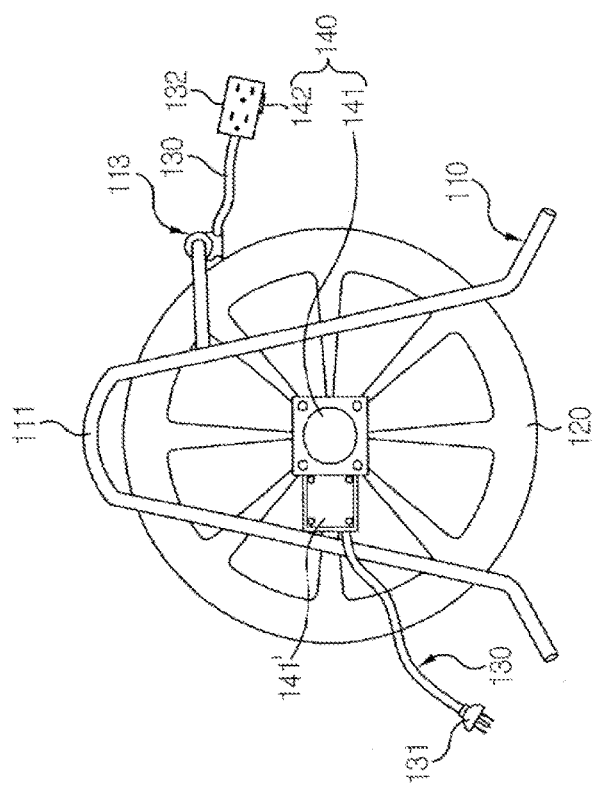
FIG. 5 is a side view of the alternative embodiment of the automated cord reel apparatus of the present invention.
Figure 6:
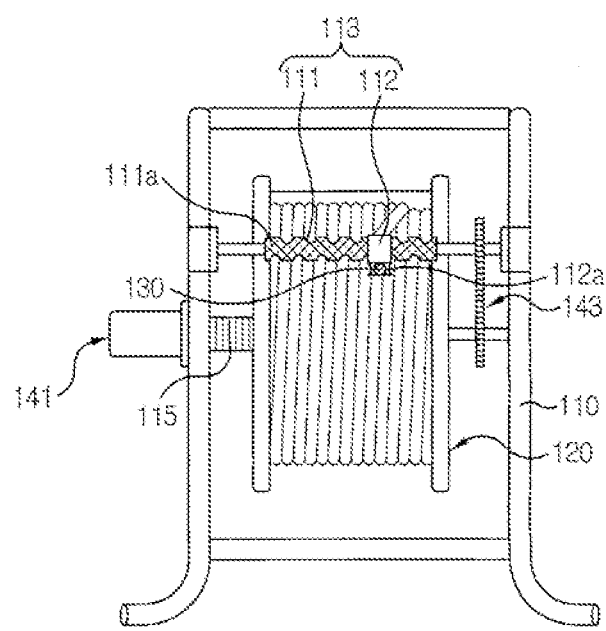
FIG. 6 is a front view of the alternative embodiment of the automated cord reel apparatus of the present invention.

The base frame 110 is formed with pair of pipe members bent to a predetermined shape and attaching them parallel to each other as shown in FIGS. 5 and 6. The base frame 110 may further provide an upper side that serves as a handle 111 from which the user of the present invention can directly grasp. It is preferred that the base frame 110 is grounded and coated with an insulating material to prevent electrocution. The primary purpose of the base frame 110 is to rotatably support the reel body 120 as shown in FIGS. 5 and 6.

The base frame 110 has a centrally mounted rotation shaft 115 that rotatably supports the reel body 120. The rotation shaft 115 has a plurality of brushes (not shown) for transmitting an external power to the electrical cord 130. The number of brushes may be determined by polarities of applied power. The present embodiment utilizes five brushes to correspond to the single phase AC power. The brushes allow the electrical cord 130 to receive power from the wall receptacle regardless of the rotation of the rotation shaft 115.

Furthermore, the base frame 110 includes a cam unit 113 that guides the entrance and exit of the electrical cord 130. The cam unit 113 comprises a bar 111 and a grip member 112, as shown in FIGS. 5 and 6. The bar 111 includes a bidirectional screw groove 111a guiding the reciprocal movement of the grip member 112. A lug (not shown) corresponding to a depth of the screw groove 111a is provided at a position corresponding to that of the screw groove 111a of the grip member 112 to allow the grip member 112 to reciprocally move in association with the rotational operation of the bar 111. The grip member 112 is preferably formed in such a manner that a surface opposite to a pair of grip units takes a concave semi-circular shape to allow an external surface of the electrical cord 130 to be gripped in a tightly contact state.

The reel body 120 is a cylindrical element that may take the shape of a wheel having spokes. The reel body 120 is centrally located within the base frame 110 with the rotation shaft 115 extending through the center so as to allow the reel body 120 to rotate freely. Finally, the electrical cord 130 is wound around the periphery of the reel body 120.

Furthermore, a driving unit 140 is connected to the reel body 120 so that it may rotate the reel body 120 to wind or unwind the electrical cord 130. The driving unit 140 comprises a motor 141 and a switch 142, as in the preferred embodiment.

The motor 141 is mounted to one side of the base frame 110, and it is preferred that the motor 141 be coaxially mounted with the rotation shaft 115, whereby the power from the motor 141 can be directly transferred to the rotation shaft. It should be apparent that, although the motor 141 can be mounted at other positions to transfer the power using a gear train, installation of the motor 141 at other positions is not preferred because it may cause a complicated configuration.

As discussed in the preferred embodiment, the motor 141 is controlled by a controller CB that is configured as the circuit illustrated in FIG. 3. In the same manner, the switch 142 in this alternative embodiment is configured the same way as in the preferred embodiment. That is that the switch 142 is installed at a lateral side wall surface of an extension socket 132 mounted at the second distal end of the electrical cord 130. As in the preferred embodiment, the switch 142 has a first position for the forward rotation of the motor 141, a second position for the backward rotation of the motor 141, and a neutral position to turn off the power to the motor 141.

A driving unit 140 can also be used in the alternative embodiment. The driving unit 140 includes a chained power transmission member 143 directly transmitting the power of the motor 141 to the bar 111, wherein the power transmission member 143 is preferably provided with any one of a chain and gear train to rotate the bar 111 in response to the rotation of the motor 141. That is, the bar 111 can also be rotated by the power chained transmission member 143 connected to the motor 141 when the motor 141 is rotated so as to rotate the reel body 120, whereby the grip member 112 can reciprocate by the rotation of the screw groove 111a concavely formed at the surface by the rotation of the bar 111. Successively, the electrical cord 130 gripped by the grip member 112 reciprocates along with the grip member 112, as shown in FIG. 5, and is wound or unwound such that the electrical cord 130 is not entangled, twisted, kinked, crinkled, and/or coiled, and wound or unwound in a nice neat manner.

Figure 7:
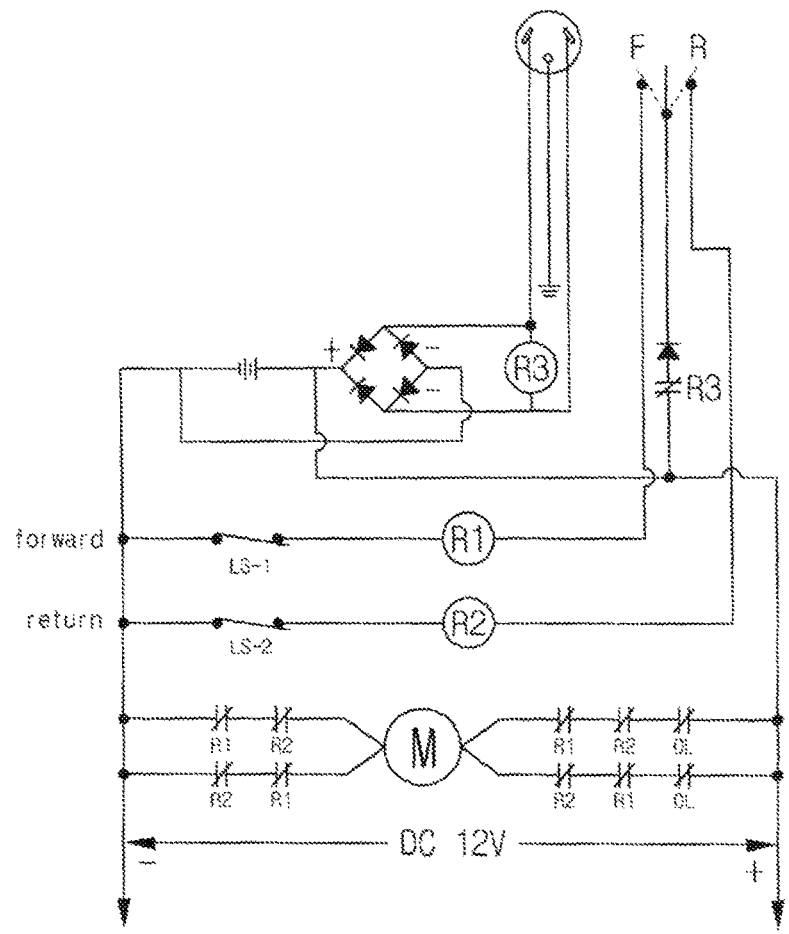
FIG. 7 is an electrical schematic diagram of the electronic circuit used in the alternative embodiment of the automated cord reel apparatus of the present invention.

Therefore, the base frame 110 of the alternative embodiment of the present invention may be fixedly installed on an electric car or an outdoor camping car. In this case, the motor 141 is preferably operated by a DC battery power of the electric car or the outdoor camping car, as shown in FIG. 7.

Generally, the camping car is mounted with a variety of electronic products necessary for camping life, and a electrical cord is provided that is capable of using the electronic products by being connected to an electricity supply receptacle provided by a camping site. However, the electrical cord tends to become entangled either during use or in the winding process after use. As such, the present invention may be used to solve these shortcomings.

Furthermore, the motor 141 can be powered using a portable battery. Thus, the cord reel 100 of the present invention can be made portable by the use of a battery.

As apparent from the foregoing, the reel cord apparatus according to the present invention has an industrial applicability in that a motor is forwardly/backwardly rotated by a switch operation to extend and/or retract an electrical cord at a predetermined speed and force, whereby the electrical cord can be prevented from being entwined during extension and/or extraction of the electrical cord. The switch that controls the rotating motor is mounted on to the extension socket or receptacle allowing the user to operate the motor without having to walk back to the housing or the location of the control unit or motor.

It is understood that the described embodiments of the present invention are illustrative only, and that modifications thereof may occur to those skilled in the art. Accordingly, this invention is not to be regarded as limited to the embodiments disclosed, but to be limited only as defined by the appended claims herein.

What is claimed is:

1. A cord reel apparatus comprising:
    a housing provided in a cylindrical shape;
    an electrical cord accommodated into the housing, one end of said electrical cord being mounted with a plug member connected to a wall receptacle and the other end of said electrical cord being mounted with an extension socket;
    an electric cord winding/unwinding device for winding or unwinding said electrical cord in response to a user option wherein said electric cord unwinding/winding device includes a guide unit guiding the winding/unwinding of said electrical cord; and
    a motor that adjusts the rotation direction of said guide unit, and a switch mounted at said extension socket to turn on/off and forwardly/backwardly rotate said motor, wherein said guide unit further comprises:
    a conically shaped guide member fixed to the housing and centrally protruded from said housing to taper toward an upper side;
    a plurality of idle roller members arranged on an unwinding/winding path of said electrical cord; and
    a main roller member gripping said electrical cord using at least one or more idle roller members and connected to the motor to receive power from the motor.

2. The cord reel apparatus of claim 1, wherein said housing is mounted with a balancing switch at a position adjacent to the plug member, and a limit switch is mounted at a position adjacent to said extension socket.

3. The cord reel apparatus of claim 1 wherein said housing includes a junction box fixing the plug member such that the plug member can be exposed at a predetermined length.

4. The cord reel apparatus of claim 1 wherein said switch is mounted at any one position of a floor surface of the extension socket, a front wall surface, a rear wall surface, and a lateral wall surface.

5. The cord reel apparatus of claim 4 wherein the switch includes a first position rotating the motor to a forward direction, and a second position rotating the motor to a backward direction.

* * * * *